United States Patent
Uzun et al.

(10) Patent No.: US 12,131,548 B2
(45) Date of Patent: Oct. 29, 2024

(54) METHOD FOR TRAINING SHALLOW CONVOLUTIONAL NEURAL NETWORKS FOR INFRARED TARGET DETECTION USING A TWO-PHASE LEARNING STRATEGY

(71) Applicant: ASELSAN ELEKTRONIK SANAYI VE TICARET ANONIM SIRKETI, Ankara (TR)

(72) Inventors: Engin Uzun, Ankara (TR); Tolga Aksoy, Ankara (TR); Erdem Akagunduz, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 364 days.

(21) Appl. No.: 17/769,343

(22) PCT Filed: Apr. 15, 2020

(86) PCT No.: PCT/TR2020/050316
§ 371 (c)(1),
(2) Date: Apr. 15, 2022

(87) PCT Pub. No.: WO2021/211068
PCT Pub. Date: Oct. 21, 2021

(65) Prior Publication Data
US 2023/0237788 A1  Jul. 27, 2023

(51) Int. Cl.
*G06V 10/82* (2022.01)
*G06T 5/20* (2006.01)
(Continued)

(52) U.S. Cl.
CPC .......... *G06V 20/56* (2022.01); *G06T 5/20* (2013.01); *G06V 10/32* (2022.01); *G06V 10/454* (2022.01);
(Continued)

(58) Field of Classification Search
CPC ...... G06V 20/56; G06V 20/52; G06V 10/454; G06V 10/32; G06V 10/82; G06V 10/94;
(Continued)

(56) References Cited

U.S. PATENT DOCUMENTS 9,668,699 B2 * 6/2017 Georgescu .............. G06F 18/28
2019/0325267 A1 * 10/2019 Chen ................... G06F 18/2415
(Continued)

FOREIGN PATENT DOCUMENTS

| CN | 107563433 A | 1/2018 |
|----|-------------|--------|
| CN | 109784278 A | 5/2019 |

(Continued)

OTHER PUBLICATIONS

Gade Rikke, et al., Thermal Cameras and Applications: a Survey, Machine Vision and Applications, 2014, pp. 245-262, vol. 25.
(Continued)

*Primary Examiner* — Allen H Nguyen
(74) *Attorney, Agent, or Firm* — Bayramoglu Law Offices LLC

(57) ABSTRACT

Disclosed is a method for training shallow convolutional neural networks for infrared target detection using a two-phase learning strategy that can converge to satisfactory detection performance, even with scale-invariance capability. In the first step, the aim is to ensure that only filters in the convolutional layer produce semantic features that serve the problem of target detection. L2-norm (Euclidian norm) is used as loss function for the stable training of semantic filters obtained from the convolutional layers. In the next
(Continued)

step, only the decision layers are trained by transferring the weight values in the convolutional layers completely and freezing the learning rate. In this step, unlike the first, the L1-norm (mean-absolute-deviation) loss function is used.

1 Claim, 2 Drawing Sheets

(51) Int. Cl.
| | |
|---|---|
| *G06V 10/32* | (2022.01) |
| *G06V 10/44* | (2022.01) |
| *G06V 10/94* | (2022.01) |
| *G06V 20/52* | (2022.01) |
| *G06V 20/56* | (2022.01) |

(52) U.S. Cl.
CPC ............... *G06V 10/82* (2022.01); *G06V 10/94* (2022.01); *G06V 20/52* (2022.01); *G06T 2207/20081* (2013.01); *G06T 2207/20084* (2013.01); *G06V 2201/07* (2022.01)

(58) Field of Classification Search
CPC ................. G06V 2201/07; G06T 5/20; G06T 2207/20081; G06T 2207/20084
USPC ......................................................... 382/156
See application file for complete search history.

(56) References Cited

U.S. PATENT DOCUMENTS

| | | | | |
|---|---|---|---|---|
| 2021/0089832 A1* | 3/2021 | Gonzalez | ................ | G06F 18/10 |
| 2021/0142177 A1* | 5/2021 | Mallya | ................... | G06N 3/084 |
| 2021/0158166 A1* | 5/2021 | Azarian Yazdi | ....... | G06N 3/048 |
| 2021/0181287 A1* | 6/2021 | Sommer | ................... | G06T 5/20 |
| 2021/0194888 A1* | 6/2021 | Bhaskar S | .......... | G06F 16/3347 |
| 2021/0209387 A1* | 7/2021 | Nikitidis | ............. | G06V 10/764 |

FOREIGN PATENT DOCUMENTS

| | | |
|---|---|---|
| CN | 109816695 A | 5/2019 |
| WO | 2019199244 A1 | 10/2019 |

OTHER PUBLICATIONS

H. Seckin Demir, et al., Vessel Classification on UAVs using Inertial Data and IR Imagery, 2015.
Carmine Clemente, et al., Automatic Target Recognition of Military Vehicles With Krawtchouk Moments, IEEE Transactions on Aerospace and Electronic Systems, 2017, pp. 493-500, vol. 53, No. 1.
Shaoqing Ren, et al., Faster R-CNN: Towards Real-Time Object Detection with Region Proposal Networks, 2016, pp. 1-14.
Joseph Redmon, et al., You Only Look Once: Unified, Real-Time Object Detection, 2016.
Erhan Gundogdu, et al., Comparison of Infrared and Visible Imagery for Object Tracking: Toward Trackers with Superior IR Performance, 2015, pp. 1-9.
Daniel König, et al., Fully Convolutional Region Proposal Networks for Multispectral Person Detection, IEEE Conference on Computer Vision and Pattern Recognition Workshops, 2017, pp. 243-250.
Xiaodong Kuang, et al., Single Infrared Image Stripe Noise Removal Using Deep Convolutional Networks, IEEE Photonics Journal, 2017, pp. 1-13, vol. 9, No. 4.
Hang Zhao, et al., Loss Functions for Image Restoration With Neural Networks, IEEE Transactions on Computational Imaging, 2017, pp. 47-57, vol. 3, No. 1.
David Shumaker, Sensiac (Military Sensing Information Analysis Center) for PEOs/PMs, Information for the Defense Community, 2008.

* cited by examiner

METHOD FOR TRAINING SHALLOW CONVOLUTIONAL NEURAL NETWORKS FOR INFRARED TARGET DETECTION USING A TWO-PHASE LEARNING STRATEGY

CROSS REFERENCE TO THE RELATED APPLICATIONS

This application is the national phase entry of International Application No. PCT/TR2020/050316, filed on Apr. 15, 2020, the entire contents of which are incorporated herein by reference.

TECHNICAL FIELD

The present invention discloses a method for training shallow convolutional neural networks for infrared target detection using a two-phase learning strategy, that can converge to satisfactory detection performance, even with scale-invariance capability.

BACKGROUND

Target detection comes to the fore as the most important application of object detection in the defence industry. Problem definition can be summarized as detecting an object specified as a target independently of signal type (infrared, radar, SAR, etc.), signal power and distance. Different approaches [1], [2], [3] are available in the defence industry literature and the field is expanding with widespread use of deep learning methods. The works on real-time object detection with region proposal networks of Ren et al. [4] and with unified network structure of Redmon et al. [5] play an important role in this development.

In recent years, the most effective examples of deep learning-based signal processing applications in the defence industry have been studies on infrared images [6], [7], [8]. The deep learning activities carried on in this field have progressed relatively slow due to the enforcement of the constraints such as the power and computing load in the system demands, so these demands created the need to develop shallow networks.

The application numbered CN109784278A relates to a marine weak and small moving ship real-time detection method based on deep learning. The method comprises the steps: carrying out target detection processing on an image in a marine monitoring system video; performing size unification operation on the size of the input image; extracting small target features by using the first part of the network structure; and for the extracted features, learning the effective features of the small targets from the shallow network by using the classifier of the second part of the network structure, and then integrating the position information of the deep network to finally classify the small targets. However, L2-norm and L1-norm loss functions are put into use at different stages in the proposed method, so that it is possible to converge to satisfactory detection performance on a shallow network, even with scale-invariance capability.

SUMMARY

Convolutional Neural Networks can solve the target detection problem satisfactorily. However, the proposed solutions generally require deep networks and hence, are inefficient when it comes to utilising them on performance-limited systems. In this application, a shallow network solution is suggested to the infrared target detection problem, accordingly its implementation on a performance limited system. We propose a two-phase learning strategy, that can converge to satisfactory detection performance on a shallow network, even with scale-invariance capability. In first step, convolutional layers are trained using loss-value function and the filters of the trained structure are transferred to a structure that carries a different loss-value function so that the needed learning has been provided and the target detection capability has been developed in a shallow network.

DETAILED DESCRIPTION OF THE EMBODIMENTS

In this application, the problem of optimizing the target detection problem in infrared images on shallow networks and its application on a limited embedded system is studied. Works has been carried out on an architecture suitable for hardware with limited processing power and optimization study has been carried out on the number of filters needed.

Common measures in the literature have been used to measure the target detection success of the proposed shallow network. The criteria used are listed below:

Mean Intersection Over Union (mIoU): Shows how much the intersection of the real reference value and the region the neural network obtains. When this criterion is averaged for all the pictures in the data set, mIoU is obtained.

Average Detection: While the above mentioned mIoU shows how well we can localize targets, a criterion of whether the object is detected or not is needed merely to measure the performance of the target detection. For example, if there is a detection in the sufficient neighborhood of the target area, it can meet this need. For this reason, the target detection is assumed to be successful in a picture in cases where the intersection-union ratio is greater than 50% and the average of this situation is named as "detection rate" in the database.

The two main factors limiting the success of deep learning algorithms are data shortage and high hardware requirements, therefore it is challenging to apply deep learning-based solutions in performance limited systems. In shallow deep learning structures, converging to any global or local optimization value and also preventing overfitting are challenges that need to be confronted. In this study, a two-phase learning strategy is proposed to prevent overfitting and to converge to an optimization value to meet the requirements. Many different parametric values need to be optimized for a convolutional network to converge during training. The factor that affects convergence the most is undoubtedly the used loss function.

Figure 1:
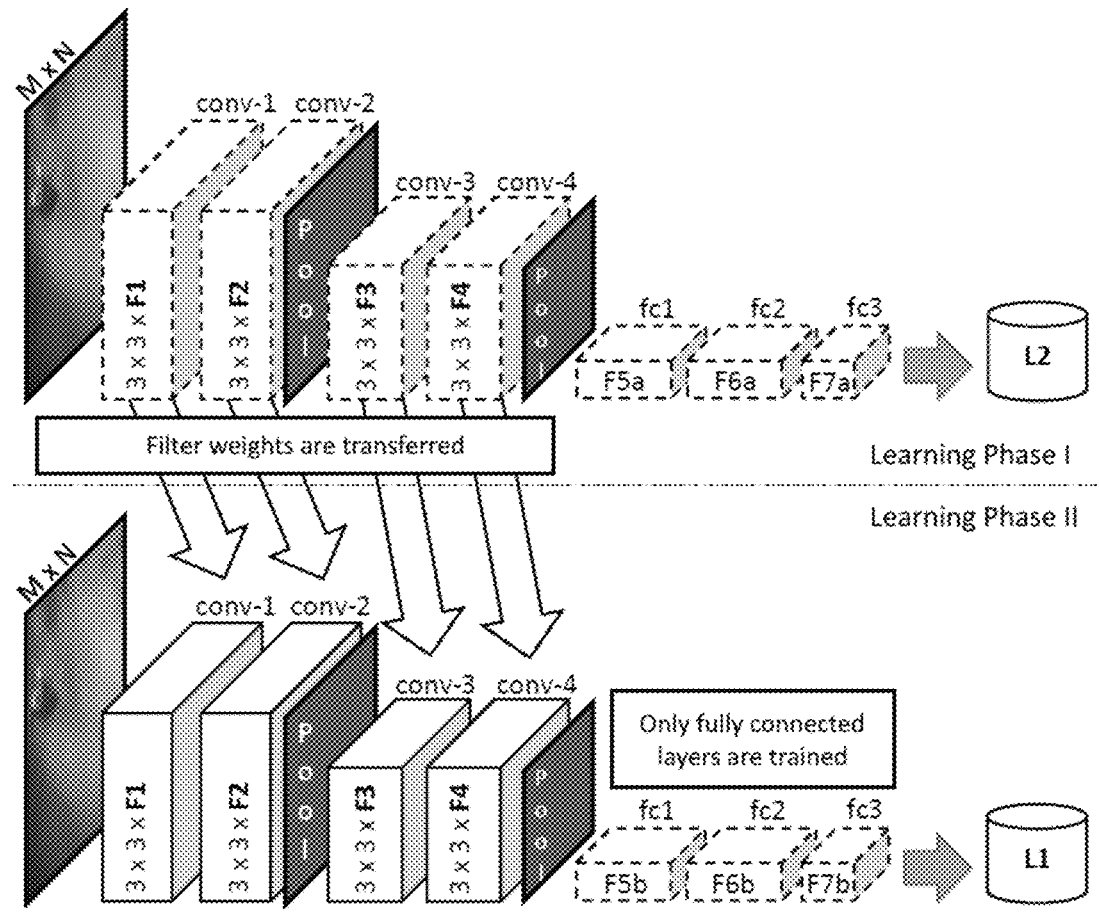
FIG. 1 shows the two-phase learning diagram on a shallow network architecture used in the present invention.

FIG. 1 shows the two-phase learning architecture used in the present invention. While designing the architecture, choosing the number of convolutional layer filters and the dimensions of the fully connected decision layers (fc1, fc2, fc3) is vital to be able to work at high speeds on limited hardware. The smaller values will allow low processing power and fewer memory units. Therefore, these values are kept parametric and experiments in different architectures have been conducted.

The shallow network used in this application was trained in two phases. In the first phase of the training, the aim is to ensure that only filters in the convolutional layer produce semantic features that serve the problem of target detection. L2-norm (Euclidian norm) was used as loss function for the stable training of the semantic filters obtained from the convolutional layers. L2-norm loss function is shown in equation below. In this equation, $y_i$ is targeted value, $f(x_i)$ is the estimated value and n corresponds to the number of samples.

$$L2-\text{norm} = \frac{\sum_{i=1}^{i=n}(y_i - f(x_i))^2}{n}$$

Euclidean norm is useful in regression problems since it is convex, stable and can be differentiated in each region. At this first step, fully connected decision layers are kept small to prevent overfitting. This step increases the effect of the convolutional filters on learning and provided them to be trained to create more qualified features.

Figure 2:
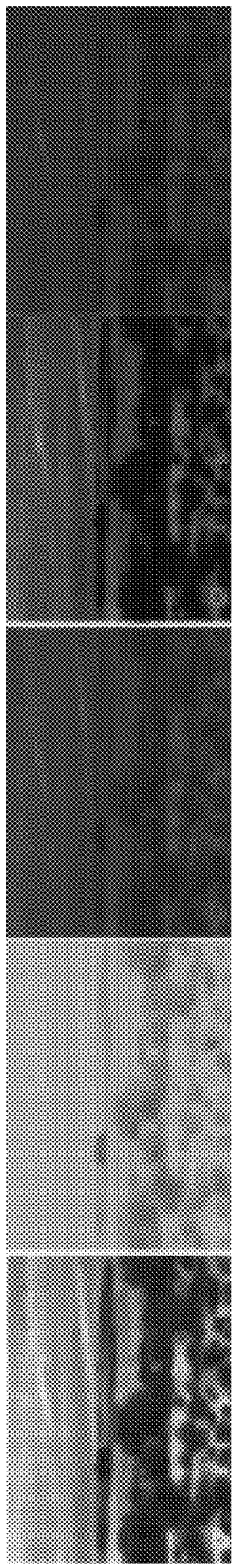
FIG. 2 shows the evolutionary convolutional network output activations.

In the first phase of the training, convolutional layers with constant feature extraction are produced, which extract the distinctive semantic features/activations of the stable and fed dataset. The obtained features are shown in FIG. 2. In this way, hot zones of the target, cold zones of the target, constant physical properties of the target or various features of the background can be distinguished with the help of filters.

In the second phase of the training, it is aimed to train only the decision layers by transferring the weight values in the convolutional layers completely and freezing the learning rate. In this stage, unlike the first phase, the L1-norm (mean-absolute-deviation) loss function is used, which is shown in FIG. 2. In this equation, $y_i$ is targeted value, $f(x_i)$ is the estimated value and n corresponds to the number of samples.

$$L1-\text{norm} = \frac{\sum_{i=1}^{i=n}|y_i - f(x_i)|}{n}$$

The main purpose of using absolute difference loss function when training decision layers is that the absolute value (L1) loss function is more resistant than Euclidean norm (L2) [9] against the outliers in the dataset.

In test cases, scenes from different optical systems and different target types containing different infrared bands and images selected from the SENSIAC[10] data set that are open to public use were used. Training different bands or optical systems on the same network is generally not operatively meaningful because of their unrelated signal characteristics. Therefore, different networks were trained for different optical systems and bands. Some examples of the data obtained with different bands and optical systems are given together with the results in FIG. 3.

Within the scope of the experiments, works are carried out with different convolutional filter numbers and different fully connected layer sizes. A parameter review was performed for both phases of learning and an appropriate shallow network size was attempted for the infrared target detection problem. Most importantly, the contribution of the present invention is underlined by making a comparison with experiments that do not apply a two-phase learning strategy.

Figure 3:
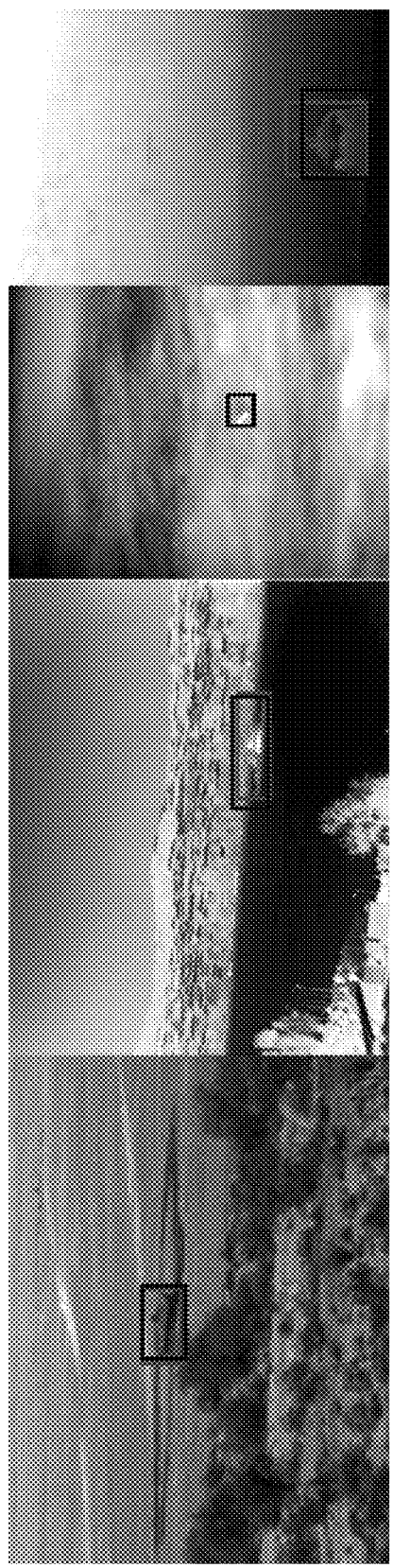
FIG. 3 shows the target detection results and the actual references with black and grey rectangular respectively.

The results obtained in the experiments are indicated by the sample results shown in FIG. 3 and the performance values shown in Table 1. FIG. 3 shows the results obtained from scenes obtained in different bands and optical systems. Even though the convolutional filters are limited in number such as 8 and 16, they are able to convey the semantic clues, which will separate the target from the background, to the decision layers.

TABLE 1

Average results for different parameters with different networks

|  | mean IU | Detection Rate | OPs |
| --- | --- | --- | --- |
| SSNet-256-L2 | 72.36 | 90.32 | 2.375.168 |
| SSNet-256-L1 | 75.01 | 92.99 | 2.375.168 |
| SSNet-256-L2 + L1 | 87.12 | 98.67 | 2.375.168 |
| SSNet-64-L2 + L1 | 83.79 | 97.76 | 1.981.184 |
| SSNet-32-L2 + L1 | 82.39 | 97.16 | 1.922.688 |

In Table 1, the number of nodes used in fully connected (decision) layers and learning strategy are specified in the network name. For example, SSNet-64-L2+L1 means that 64 nodes are used in decision layers and a two-step learning strategy is applied. As the number of nodes in the decision layers decreases, success rate decreases as expected. However, most of the time, the chance of implementation in limited systems is only achieved by restricting the values in the decision layers.

Table 1 reveals two very important results. First, the detection rate is clearly higher in networks where the two-step learning strategy (L1+L2) is applied, even though the number of nodes in the decision layers was considerably lower than those without this strategy. Another important result is that satisfactory results can be achieved in networks where two-step learning is applied, even if the number of nodes in decision layers drops to a very low value of 32. This shows that the proposed learning strategy is successful.

In addition to the success of networks of different sizes, Table 1 also shows the number of operations (OPs) they require. The number of operations required decreases as the number of convolutional filters and the number of decision layer nodes decreases as expected. The studies were implemented on a processor with a speed of Z MHz/second with 32-bit fixed point variables. Accordingly, the average processing time of a process containing N OPs can be determined by the formula N×K/Z when the number of cycles required for the 32-bit fixed point multiplication is K. For instance, the shallow network comprising 32 decision layers in Table 1 takes 160 ms to process a 60×60 infrared image on an embedded and energy efficient processor.

REFERENCES

[11] R. Gade and T. B. Moeslund, "Thermal cameras and applications: a survey," *Machine vision and applications*, vol. 25, no. 1, pp. 245-262, 2014.

[12] H. S. Demir, E. Akagündüz, and S. K. Pakin, "Vessel classification on uavs using inertial data and ir imagery," in 2015 23rd *Signal Processing and Communications Applications Conference (SIU)*, May 2015, pp. 499-502.

[13] C. Clemente, L. Pallotta, D. Gaglione, A. De Maio, and J. J. Soraghan, "Automatic target recognition of military vehicles with krawtchouk moments," *IEEE Transactions on Aerospace and Electronic Systems*, vol. 53, no. 1, pp. 493-500, 2017.

[14] S. Ren, K. He, R. B. Girshick, and J. Sun, "Faster RCNN: towards real-time object detection with region proposal networks," *CoRR*, vol. abs/1506.01497, 2015. [Online]. Available: http://arxiv.org/abs/1506.01497

[15] J. Redmon, S. K. Divvala, R. B. Girshick, and A. Farhadi, "You only look once: Unified, real-time object detection," *CoRR*, vol. abs/1506.02640, 2015. [Online]. Available: http://arxiv.org/abs/1506.02640

[16] E. Gundogdu, H. Ozkan, H. S. Demir, H. Ergezer, E. Akagündüz, and S. K. Pakin, "Comparison of infrared and visible imagery for object tracking: Toward trackers with superior ir performance," in *2015 IEEE Conference on Computer Vision and Pattern Recognition Workshops (CVPRW)*, June 2015, pp. 1-9.

[17] D. Konig, M. Adam, C. Jarvers, G. Layher, H. Neumann, and M. Teutsch, "Fully convolutional region proposal networks for multispectral person detection," in *Proceedings of the IEEE Conference on Computer Vision and Pattern Recognition Workshops*, 2017, pp. 49-56.

[18] X. Kuang, X. Sui, Q. Chen, and G. Gu, "Single infrared image stripe noise removal using deep convolutional networks," *IEEE Photonics Journal*, vol. 9, no. 4, pp. 1-13, August 2017.

[19] H. Zhao, O. Gallo, I. Frosio, and J. Kautz, "Loss functions for image restoration with neural networks," *IEEE Transactions on Computational Imaging*, vol. 3, no. 1, pp. 47-57, 2016.

[20] D. Shumaker. *SENSIAC (Military Sensing Information Analysis Center) for PEOs PMs*. MILITARY SENSING INFORMATION ANALYSIS CENTER ATLANTA GA, 2008.

What we claim is:

1. A method for training shallow convolutional neural networks for infrared target detection using a two-phase learning strategy, comprising:
   training filters in a convolutional layer with an L2-norm loss function to produce semantic features and trained filters, and
   training fully connected decision layers with an L1-norm loss function by using the trained filters,
   wherein the fully connected decision layers are kept smaller than layers without two-phase learning to prevent overfitting while training the filters in a first time.

* * * * *